United States Patent
Shuman et al.

(10) Patent No.: US 12,225,439 B2
(45) Date of Patent: Feb. 11, 2025

(54) ADVANCED VEHICLE MESSAGE TRANSMISSION OPTIMIZATION

(71) Applicant: QUALCOMM Incorporated, San Diego, CA (US)

(72) Inventors: Mohammed Ataur Rahman Shuman, San Diego, CA (US); Soumya Das, San Diego, CA (US); Mohammad Nekoui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/710,685

(22) Filed: Mar. 31, 2022

(65) Prior Publication Data

US 2023/0319527 A1    Oct. 5, 2023

(51) Int. Cl.
*H04W 4/40*    (2018.01)
*H04W 8/24*    (2009.01)

(52) U.S. Cl.
CPC ............... *H04W 4/40* (2018.02); *H04W 8/24* (2013.01)

(58) Field of Classification Search
CPC ............ H04W 4/40; H04W 8/24; H04W 4/46
See application file for complete search history.

(56) References Cited

U.S. PATENT DOCUMENTS

| | | | |
|---|---|---|---|
| 2015/0199905 A1* | 7/2015 | Hayee | G08G 1/096716 701/118 |
| 2017/0222990 A1* | 8/2017 | Romansky | H04L 9/3268 |
| 2018/0077518 A1 | 3/2018 | Nguyen et al. | |
| 2018/0365909 A1* | 12/2018 | Cheng | H04Q 9/00 |
| 2019/0037448 A1* | 1/2019 | Shan | H04W 60/04 |
| 2019/0394625 A1* | 12/2019 | Kim | H04W 36/0022 |
| 2021/0082210 A1 | 3/2021 | Sakr | |
| 2021/0250740 A1* | 8/2021 | Zielinski | H04W 4/08 |
| 2022/0240168 A1* | 7/2022 | Somayazulu | H04W 48/16 |
| 2022/0295253 A1* | 9/2022 | Hwang | H04W 4/40 |
| 2022/0400403 A1* | 12/2022 | Vassilovski | H04W 4/38 |

FOREIGN PATENT DOCUMENTS

EP    3400727 A1    11/2018

OTHER PUBLICATIONS

ITS America, The Future of V2X: 30 MHz Application Map (Year: 2021).*
International Search Report and Written Opinion—PCT/US2023/061789—ISA/EPO—May 23, 2023.

* cited by examiner

*Primary Examiner* — Deepa Belur
(74) *Attorney, Agent, or Firm* — Polsinelli/Qualcomm

(57) ABSTRACT

Systems and techniques are described for identifying and/or classifying capabilities associated with a wireless device. In some aspects, a process of the disclosed technology can include steps for receiving a first message comprising V2X capability information associated with a first wireless device, and transmitting via the at least one transceiver, a second message to the first wireless device, wherein the second message is associated with a periodicity based on the V2X capability information associated with the first wireless device.

30 Claims, 12 Drawing Sheets

ADVANCED VEHICLE MESSAGE TRANSMISSION OPTIMIZATION

FIELD

The present disclosure relates generally to communication systems. For example, aspects of the present disclosure relate to solutions for identifying vehicle messaging capabilities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for determining capabilities of a wireless device. According to at least one example, an apparatus for determining capabilities of a wireless device, the apparatus comprising: at least one transceiver; at least one memory; and at least one processor communicatively coupled to the at least one transceiver and the at least one memory, the at least one processor configured to: receive, via the at least one transceiver, a first message comprising V2X capability information associated with a first wireless device; and transmit, via the at least one transceiver, a second message to the first wireless device, wherein the second message is associated with a periodicity based on the V2X capability information associated with the first wireless device.

In another example, a method for determining capabilities of a wireless device is provided. According to at least one example, a method for determining capabilities of a wireless device can include: receiving a first message comprising V2X capability information associated with a first wireless device; and transmitting a second message to the first wireless device, wherein the second message is associated with a periodicity based on the V2X capability information associated with the first wireless device.

In another example, a non-transitory computer-readable storage medium is provided that comprises at least one instruction for causing a computer or processor to: receive a first message comprising V2X capability information associated with a first wireless device; and transmitting a second message to the first wireless device, wherein the second message is associated with a periodicity based on the V2X capability information associated with the first wireless device.

In another example, an apparatus for determining capabilities of a wireless device is provided. The apparatus includes: means for receiving a first message comprising V2X capability information associated with a first wireless device; and means for transmitting a second message to the first wireless device, wherein the second message is associated with a periodicity based on the V2X capability information associated with the first wireless device.

In some aspects, the apparatus is, or is part of, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle, a server computer, a robotics device, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
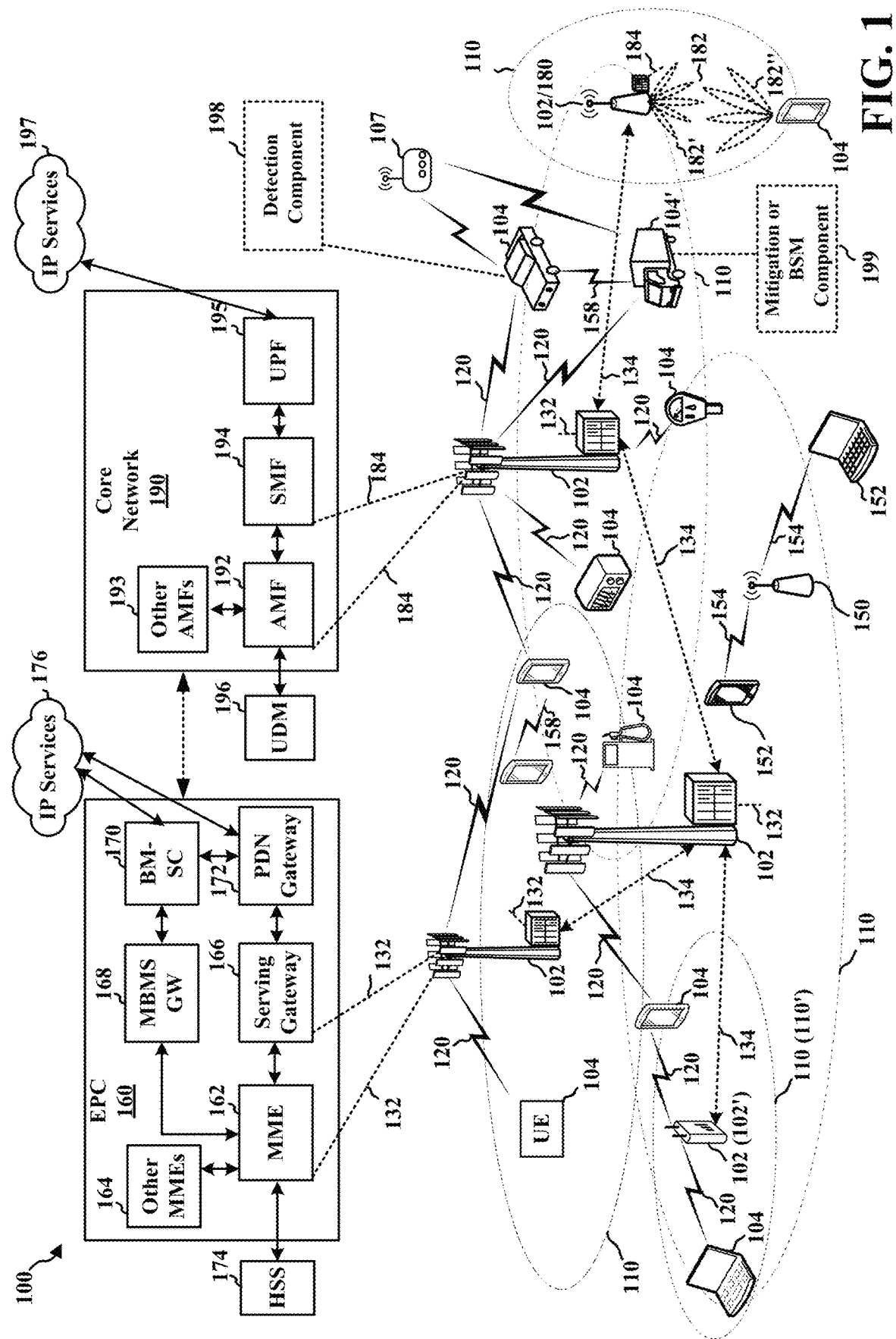
FIG. 1 is a diagram illustrating an example of a wireless communications system and an access network.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein can be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless devices (e.g., vehicles, infrastructure such as a road side units (RSUs), mobile devices, or other wireless devices) may report information to other wireless devices. For example, a vehicle can transmit a basic safety message (BSM), which can include information such as information regarding the vehicle position, heading, speed, information relating to a state and predicted path of the vehicle, and/or other information. Some wireless devices (e.g., vehicles) do not support transmission or reception of some or all messages. For example, advanced vehicle-to-everything (V2X) Application layer Standard specifications are under development to support advanced safety, autonomous driving, and other non-safety use cases. Such Standard specifications include, for example, Sensor Sharing standard specification (e.g., SAE J3224), an On-Board System Requirements for V2V Safety standard specification (e.g., J2945/1), a Maneuver Sharing and Coordinating standard specification (e.g., SAE J3186), a Reference System Architecture standard specification (SAE J3161), and/or a Cooperative Adaptive Cruise Control and Platooning standard specification (e.g., SAE J2945/6). Using sensor sharing as an illustrative example, a vehicle that is configured to operate according to the Sensor Sharing standard specification (e.g., SAE J3224) can transmit, receive, and process sensor data sharing messages (SDSMs) that share sensor-based information among wireless devices.

Some vehicles may not be able to receive such advanced V2X application layer messages and may only be able to support other types of messages (e.g., BSMs, Traveler Information Messages (TIMs), etc.). For example, a vehicle may need to be equipped with one or more next generation physical layer capabilities to receive and/or send such advanced application layer messages, such as cellular-V2X (C-V2X) capabilities (e.g., a 5G/NR C-V2X capable vehicle will be able to support more advanced use cases such as sensor sharing via one or more SDSMs), WiFi™ based Dedicated Short Range Communication (DSRC) capabilities (e.g., a 802.11bd capable vehicle will be able to support more advanced use cases such as sensor sharing), and/or other capabilities.

In some cases, there may be situations when there are no wireless devices (e.g., vehicles, RSUs, mobile devices, etc.) that can receive advanced V2X application layer messages, such as SDSMs, within communication range of a wireless device that is configured to operate according to an advanced application layer Standard specification (e.g., the Sensor Sharing standard specification such as SAE J3224). In such examples, indiscriminately sending advanced messages (e.g., SDSMs) will not help if there is no SDSM capable vehicle available to receive and use that message.

Further, in some cases, it is possible that BSMs and SDSMs (or other application layer messages) will use the same intelligent transport system (ITS) channel. In such cases, load on the ITS channel will be critical for the C-V2X deployment, where efficient use of the channel will be very important. It would be beneficial to reduce the load on the ITS channel by sending certain messages (e.g., SDSMs) only when there are nearby wireless devices (e.g., vehicles, RSUs, mobile devices, etc.) that can receive the messages.

Systems, apparatuses, processes (also referred to as methods), and computer-readable media (collectively referred to herein as systems and techniques) are described herein for optimizing advanced device message transmission. For example, a wireless device (e.g., a vehicle, RSU, mobile device, etc.) can include capability information indicating capabilities of the wireless device (e.g., specifications and/or applications that are supported by the wireless device) in one or more messages (e.g., in a BSM message). The capability information can include information related to enhanced V2X safety capabilities, autonomous driving capabilities, and/or other advanced non-safety or safety use cases. The capability information can be used to convey (e.g., by sending the one or more messages to one or more receiving devices) enhanced V2X communication capabilities of the transmitting wireless device. In one example, capability information can be used to specify supported wireless standards, including but not limited to one or more of a Sensor Sharing Standard specification (e.g., SAE J3224), an On-Board System Requirements for V2V Safety Standard specification (e.g., J2945/1), a Maneuver Sharing and Coordinating standard (e.g., SAE J3186), a Reference System Architecture Standard specification (SAE J3161), and/or Cooperative Adaptive Cruise Control and Platooning Standard specification (e.g., SAE J2945/6), etc. In other approaches, capability information may be used to indicate specific applications supported by the transmitting wireless device, for example, by indicating one or more Public Safety Identification (PSID), for the supported application(s).

In some examples, a receiving wireless device can identify, and in some cases classify, legacy wireless devices (e.g., vehicles that support LTE V2X only) that do not support the aforementioned advanced communication use cases. Aspects of the systems and techniques include solutions for a receiving wireless device determining the capabilities of a wireless device (e.g., a first wireless device) based on capability information reported by a transmitting wireless device, such as in a BSM received from the transmitting wireless device. Based on the capability information, the receiving wireless device can classify the transmitting wireless device according to the indicated capabilities. In some cases, the receiving wireless device can then determine whether to transmit, how frequently to transmit, and/or certain type of information to include in one or more advanced messages (e.g., advanced C-V2X messages, such as SDSMs) based on the classification of the transmitting device.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RSU is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (S Cell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or road side unit (RSU) 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a road side unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as RSU 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Figure 2:
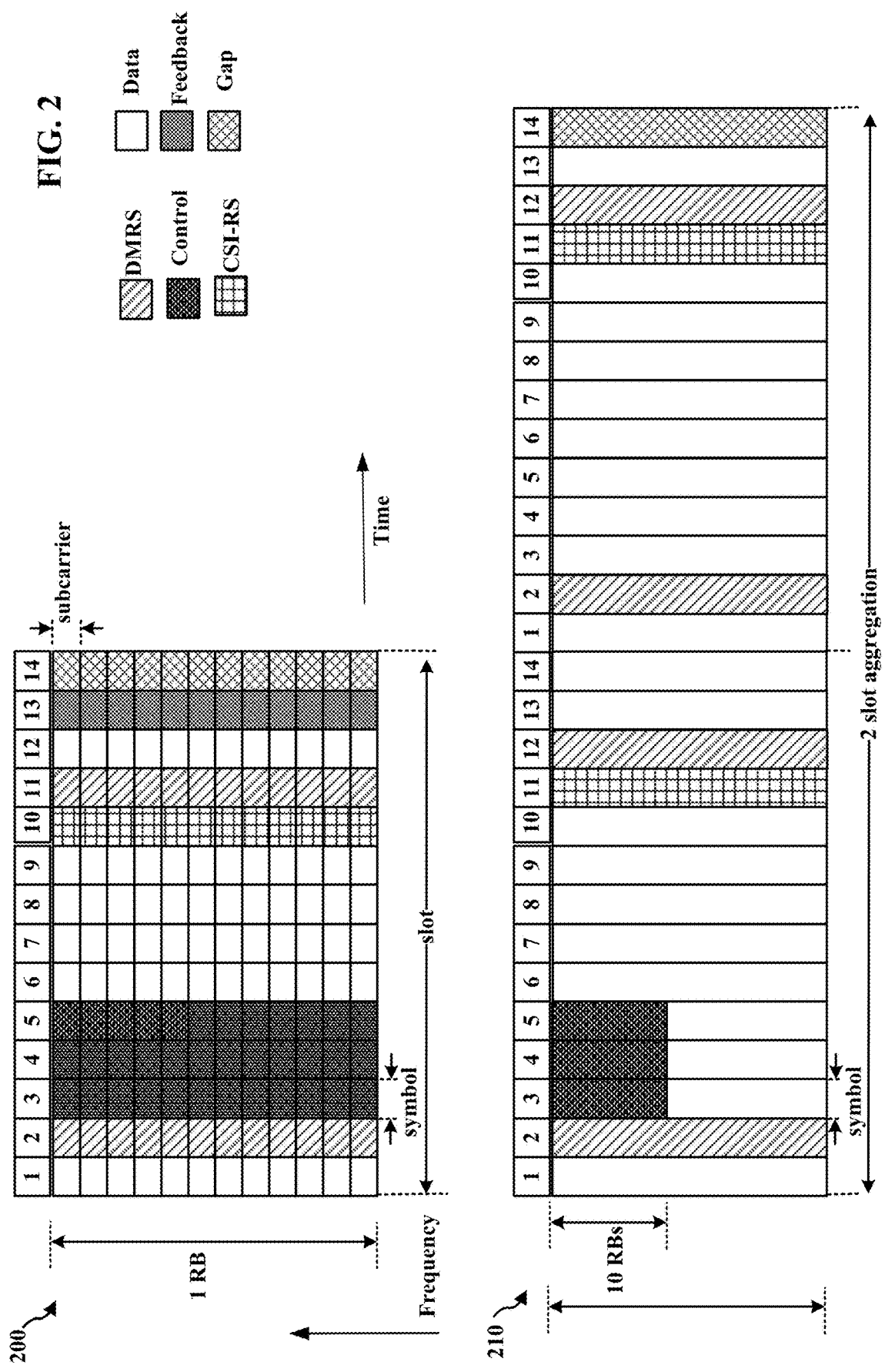
FIG. 2 illustrate example aspects of a sidelink slot structure, in accordance with some aspects of the present disclosure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3:
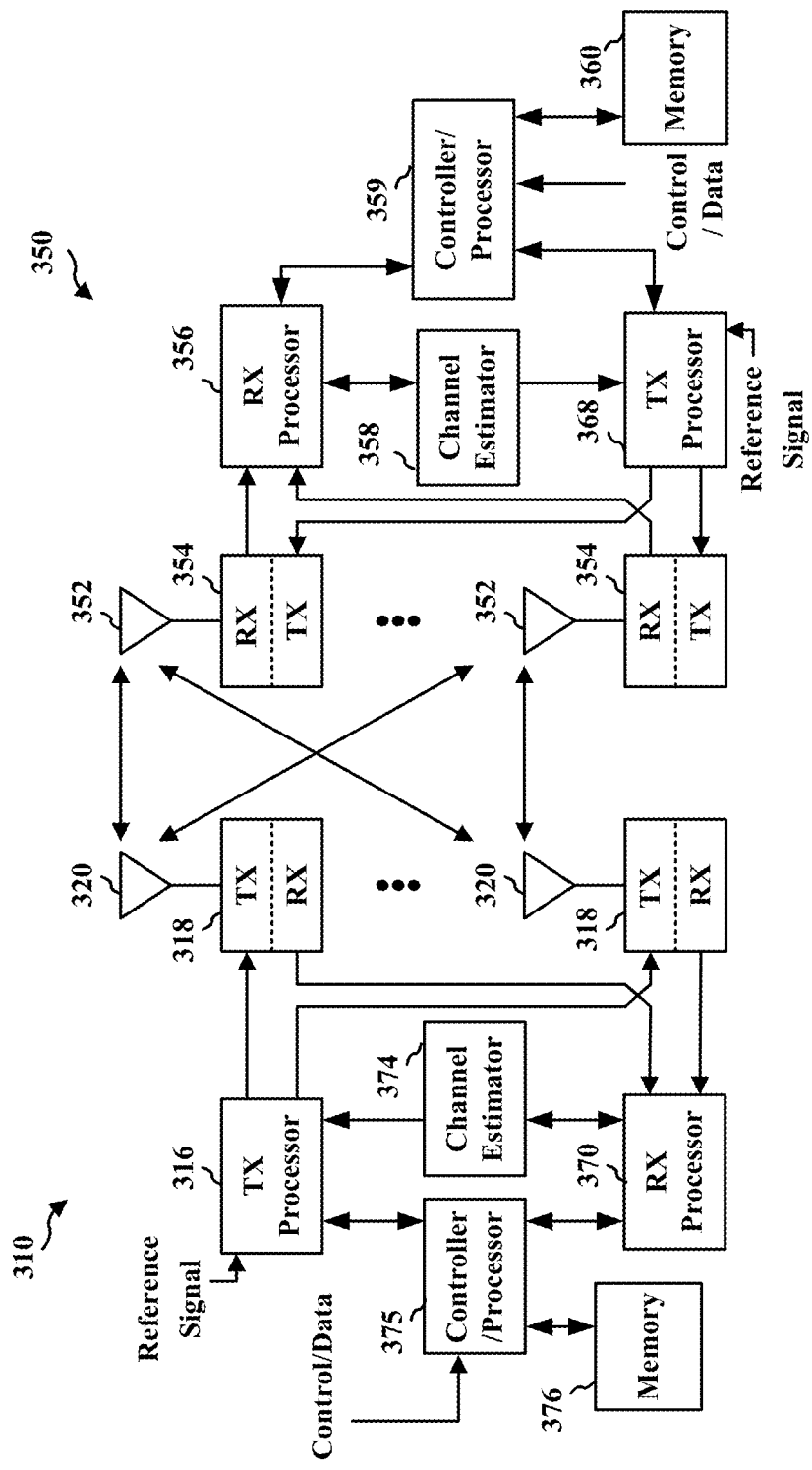
FIG. 3 is a diagram illustrating an example of a first device and a second device involved in wireless communications (e.g., V2V communications, V2X communications, and/or other device-to-device communication), in accordance with some aspects of the present disclosure.

FIG. 3 is a block diagram 300 of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 or 199 of FIG. 1.

Figure 4:
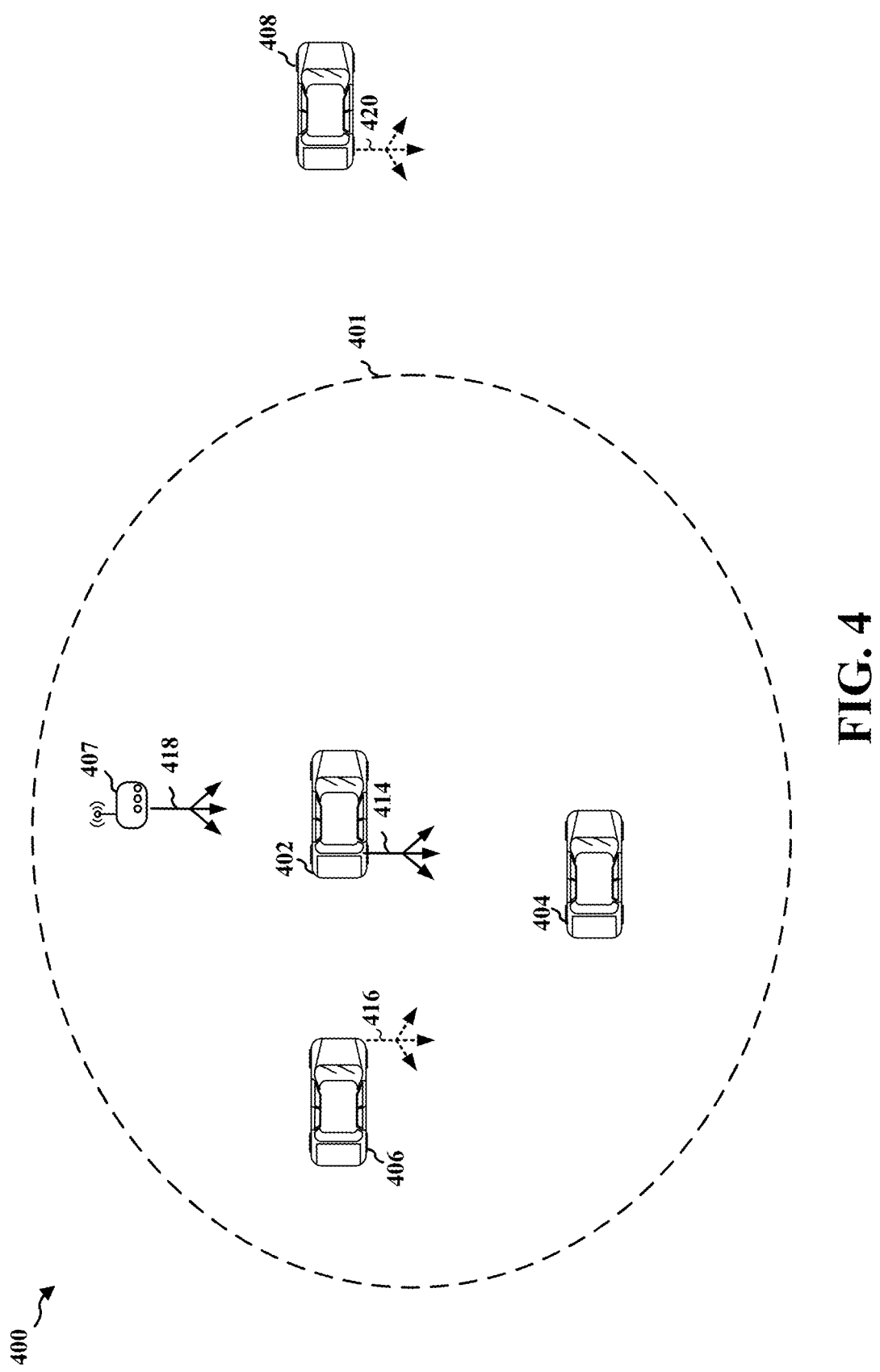
FIG. 4 is a diagram illustrating an example of devices involved in wireless communications (e.g., sidelink communications), in accordance with some aspects of the present disclosure.

FIG. 4 illustrates an example 400 of wireless communication between devices based on sidelink communication, such as V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 (and 418 by RSU 407) may be broadcast or multicast to nearby devices. For example, UE 414 may transmit communication intended for receipt by other UEs within a range 401 of UE 414. Additionally/alternatively, RSU 407 may receive communication from and/or transmit communication 418 to UEs 402, 404, 406, 408.

UE 402, 404, 406, 408 or RSU 407 may comprise a detection component, similar to 198 described in connection with FIG. 1. UE 402, 404, 406, 408 or RSU 407 may also comprise a basic safety message (BSM) or mitigation component, similar to 199 described in connection with FIG. 1.

Figure 5A:
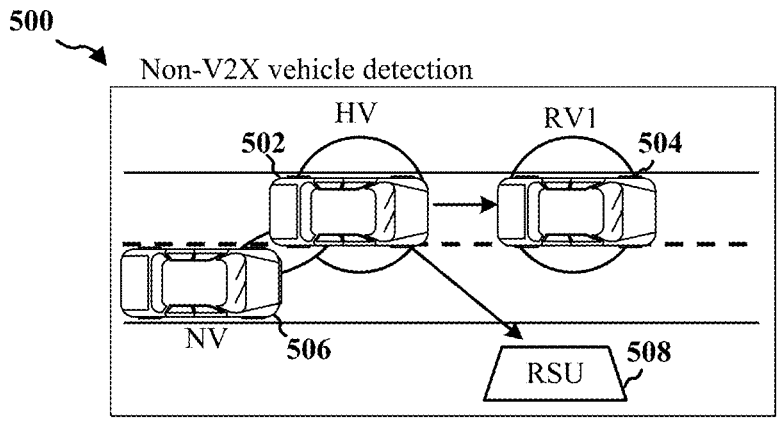
FIGS. 5A-5D are diagrams illustrating examples of sensor-sharing for cooperative and automated driving systems, in accordance with some aspects of the present disclosure.
Figure 5B:
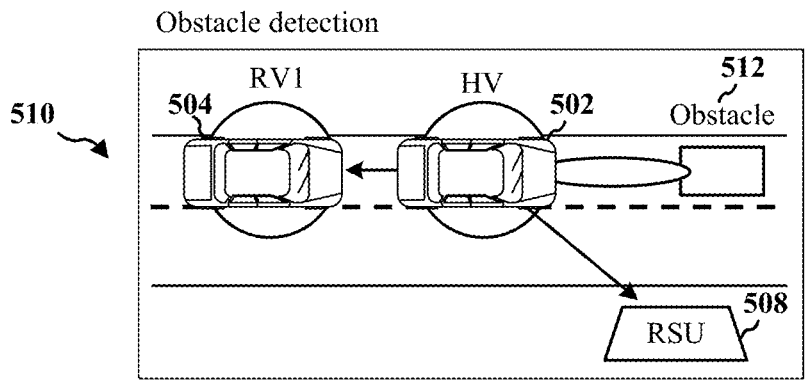
Figure 5C:
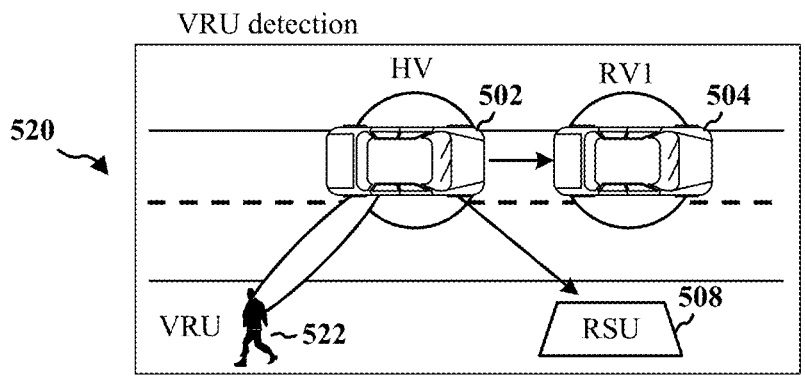
Figure 5D:
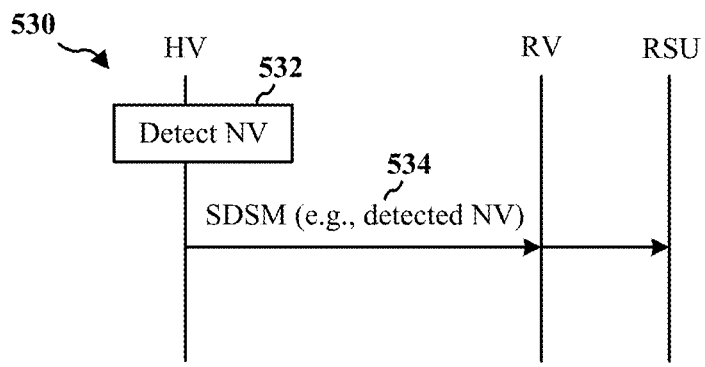
Figure 6:
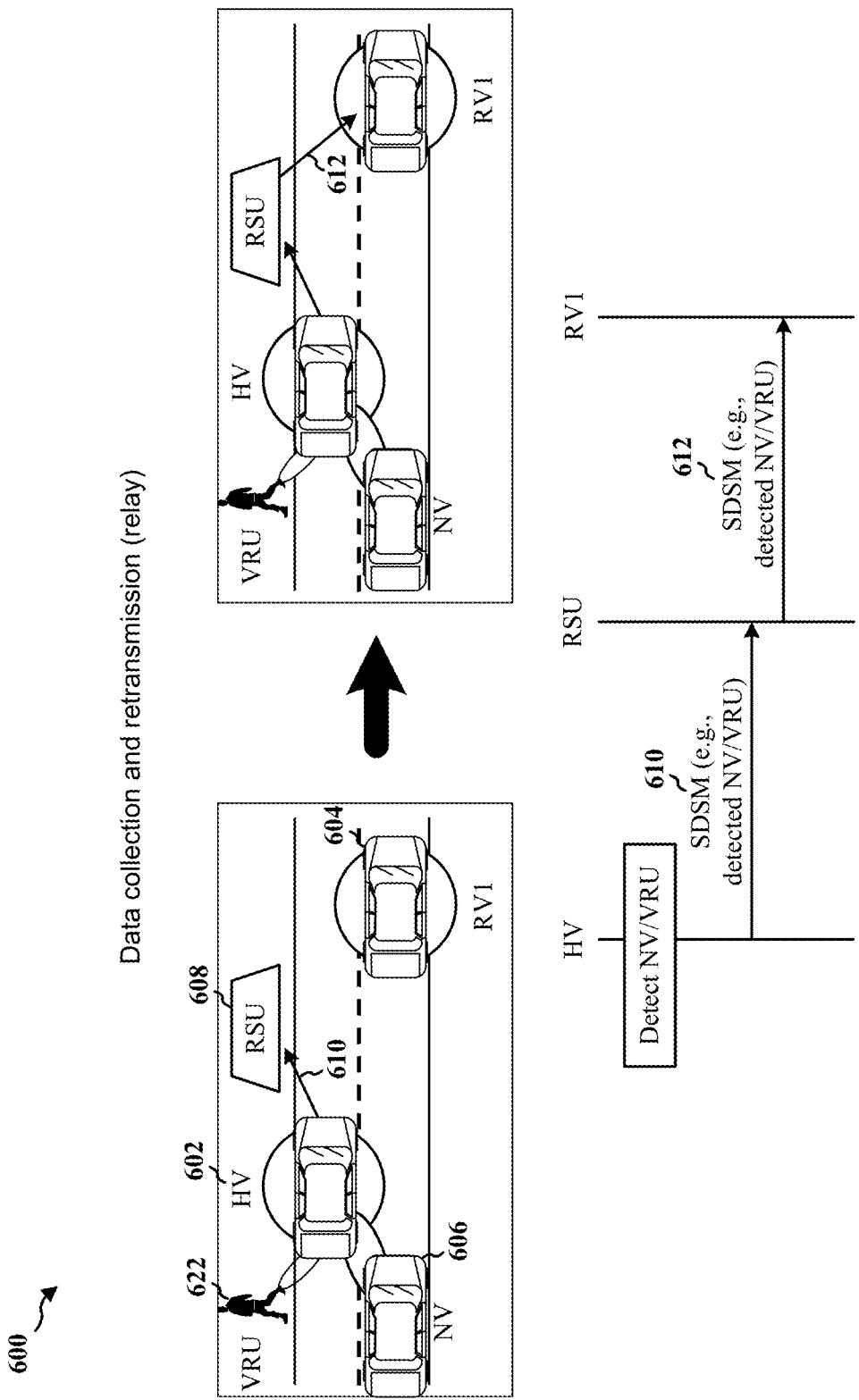
FIG. 6 is a diagram illustrating an example of sensor-sharing for cooperative and automated driving systems, in accordance with some aspects of the present disclosure.

In wireless communications, such as V2X communications, V2X entities may perform sensor sharing with other V2X entities for cooperative and automated driving. For example, with reference to diagram 500 of FIG. 5A, the host vehicle (HV) 502 may detect a number of items within its environment. For example, the HV 502 may detect the presence of the non-V2X entity (NV) 506 at block 532. The HV 502 may inform other entities, such as a first remote vehicle (RV1) 504 or a road side unit (RSU) 508, about the presence of the NV 506, if the RV1 504 and/or the RSU 508, by themselves, are unable to detect the NV 506. The HV 502 informing the RV1 504 and/or the RSU 508 about the NV 506 is a sharing of sensor information. With reference to diagram 510 of FIG. 5B, the HV 502 may detect a physical obstacle 512, such as a pothole, debris, or an object that may be an obstruction in the path of the HV 502 and/or RV1 504 that has not yet been detected by RV1 504 and/or RSU 508. The HV 502 may inform the RV1 and/or the RSU 508 of the obstacle 512, such that the obstacle 512 may be avoided. With reference to diagram 520 of FIG. 5C, the HV 502 may detect the presence of a vulnerable road user (VRU) 522 and may share the detection of the VRU 522 with the RV1 504 and the RSU 508, in instances where the RSU 508 and/or RV1 504 may not be able to detect the VRU 522. With reference to diagram 530 of FIG. 5D, the HV, upon detection of a nearby entity (e.g., NV, VRU, obstacle) may transmit a sensor data sharing message (SDSM) 534 to the RV and/or the RSU to share the detection of the entity. The SDSM 534 may be a broadcast message such that any receiving device within the vicinity of the HV may receive the message. In some instances, the shared information may be relayed to other entities, such as RVs. For example, with reference to diagram 600 of FIG. 6, the HV 602 may detect the presence of the NV 606 and/or the VRU 622. The HV 602 may broadcast the SDSM 610 to the RSU 608 to report the detection of NV 606 and/or VRU 622. The RSU 608 may relay the SDSM 610 received from the HV 602 to remote vehicles such that the remote vehicles are aware of the presence of the NV 606 and/or VRU 622. For example, the RSU 608 may transmit an SDSM 612 to the RV1 604, where the SDSM 612 includes information related to the detection of NV 606 and/or VRU 622.

As noted previously, some wireless devices (e.g., vehicles) do not support transmission or reception of certain messages, such as advanced C-V2X messages defined by Standard specifications that are under development to support advanced safety, autonomous driving, and other non-safety use cases. Examples of such Standard specifications include a Sensor Sharing standard specification (e.g., SAE J3224), an On-Board System Requirements for V2V Safety standard specification (e.g., J2945/1), a Maneuver Sharing and Coordinating standard specification (e.g., SAE J3186), a Reference System Architecture standard specification (SAE J3161), and/or a Cooperative Adaptive Cruise Control and Platooning standard specification (e.g., SAE J2945/6). For instance, a vehicle configured to operate according to the Sensor Sharing standard specification (e.g., SAE J3224) can transmit, receive, and process sensor data sharing messages (SDSMs) that share sensor-based information among wireless devices.

A vehicle may need to be equipped with one or more next generation physical layer capabilities to receive and/or send such advanced application layer messages. One example of a physical layer capability that allows a device to transmit, receive, and process advanced application layer messages includes cellular-V2X (C-V2X) capabilities. For example, a 5G/NR C-V2X capable vehicle will be able to support more advanced use cases, such as sensor sharing via one or more SDSMs. Another example includes WiFi™ based Dedicated Short Range Communication (DSRC) capabilities, where a 802.11bd capable vehicle will be able to support more advanced use cases, such as sensor sharing. Vehicles that are not equipped with such capabilities may only be able to support other types of messages (e.g., BSMs, Traveler Information Messages (TIMs), etc.). For example, According to systems and techniques described herein, a wireless device (e.g., a vehicle, RSU, mobile device, etc.) can include capability information indicating capabilities of the wireless device (e.g., specifications and/or applications that are supported by the wireless device) in one or more messages (e.g., in a BSM message). The capability information can include information related to enhanced V2X safety capabilities, autonomous driving capabilities, and/or other advanced non-safety or safety use cases. The capability information can be used to convey (e.g., by sending the one or more messages to one or more receiving devices) enhanced V2X communication capabilities of the transmitting wireless device. In one example, capability information can be used to specify supported wireless standards, including but not limited to one or more of a Sensor Sharing Standard specification (e.g., SAE J3224), an On-Board System Requirements for V2V Safety Standard specification (e.g., J2945/1), a Maneuver Sharing and Coordinating standard (e.g., SAE J3186), a Reference System Architecture Standard specification (SAE J3161), and/or Cooperative Adaptive Cruise Control and Platooning Standard specification (e.g., SAE J2945/6), etc. In other approaches, capability information may be used to indicate specific applications supported by the transmitting wireless device, for example, by indicating one or more Public Safety Identification (PSID), for the supported application(s).

There may also be cases where there are no wireless devices (e.g., vehicles, RSUs, mobile devices, etc.) that can receive advanced V2X application layer messages, such as SDSMs, within communication range of a wireless device that is configured to operate according to an advanced application layer Standard specification (e.g., the Sensor Sharing standard specification such as SAE J3224). In such examples, indiscriminately sending advanced messages (e.g., SDSMs) will not help if there is no SDSM capable vehicle available to receive and use that message.

Further, in some cases, it is possible that application layer messages (e.g., BSMs and SDSMs) will use the same intelligent transport system (ITS) channel. In such cases, load on the ITS channel will be critical for the C-V2X deployment, where efficient use of the channel will be very important. It would be beneficial to reduce the load on the ITS channel by sending certain messages (e.g., SDSMs) only when there are nearby wireless devices (e.g., vehicles, RSUs, mobile devices, etc.) that can receive the messages.

According to the systems and techniques described herein, a receiving wireless device can determine (e.g., identify, classify, etc.) legacy wireless devices (e.g., vehicles that support LTE V2X only) that do not support the advanced communication use cases noted above. For instance, the receiving wireless device can determine the capabilities of a transmitted wireless device (e.g., a first wireless device) based on capability information reported by the transmitting wireless device, such as in a message (e.g., a BSM) received from the transmitting wireless device. The receiving wireless device can classify the transmitting wireless device according to the capabilities indicated in the message.

In some aspects, the receiving wireless device can use the capability information of the transmitting first wireless device from the message and/or a classification determined for the transmitting first wireless device (e.g., based on the capability information) to determine scheduling of subsequent message transmissions and/or to determine what types of information should be included in the transmissions. By way of example, based on received capability information, a host device (or receiving device) may determine that the first wireless device does not support advanced NR V2X or 802.11bd messaging services and/or applications. As a result, the host device may modify a frequency of message transmission, for example, by suppressing SDSM transmission to reduce loads on a wireless communication channel, such as an ITS band.

In some aspects, capability information for the first wireless device can be used by the host device to classify the first wireless device (e.g., according to capabilities or services supported by the first wireless device). In instances where other advanced wireless devices are detected, such as one or more other devices supporting SDSM capabilities, the classification of the first wireless device may be included in information transmitted in one or more SDSMs by the host device. In this manner, the host device may notify other devices (e.g., vehicles) about the capabilities supported by the first wireless device. Further details regarding the classification of wireless devices based on reported device capabilities is provided in relation to FIG. 7, below.

Figure 7:
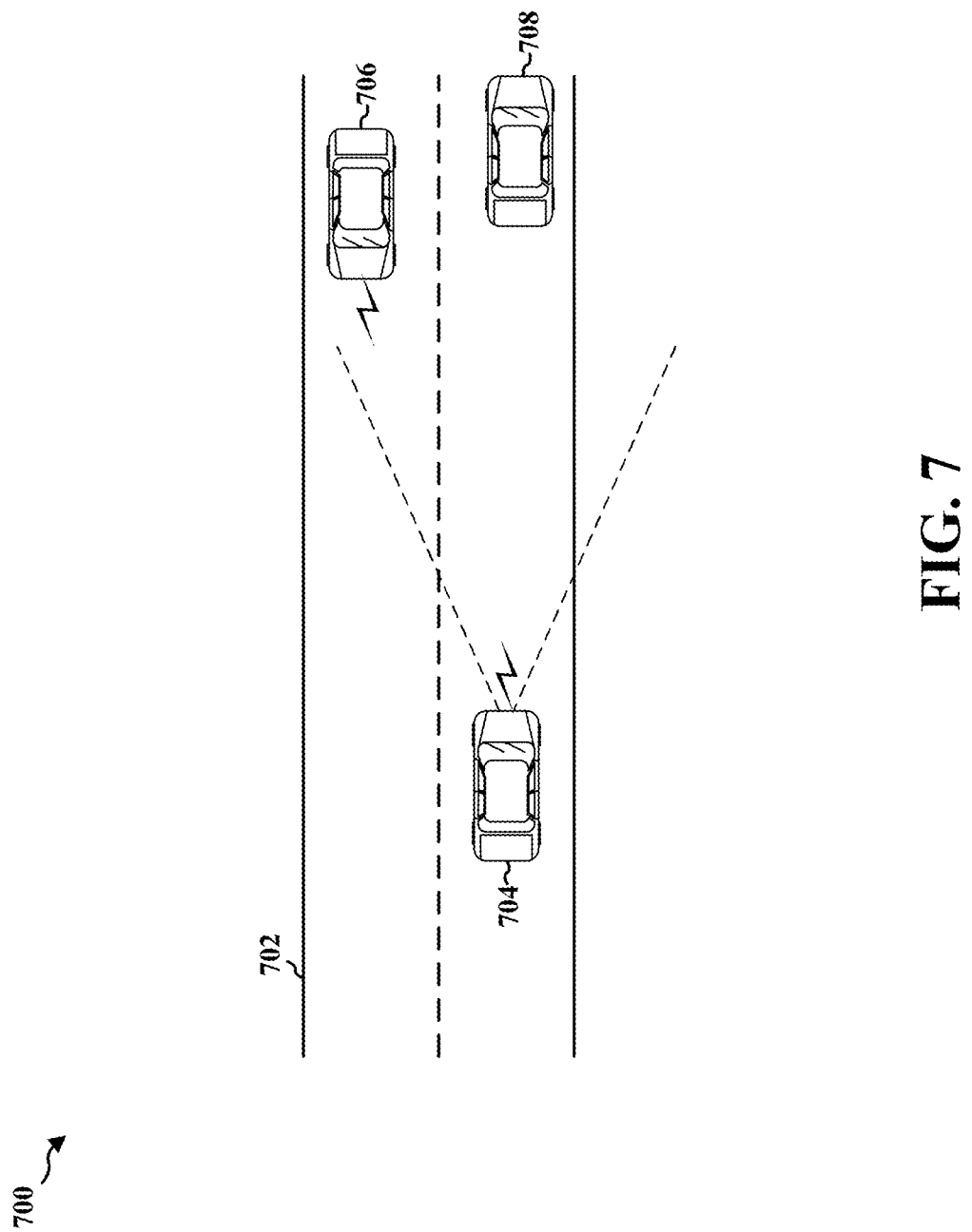
FIG. 7 is a diagram illustrating an example environment in which a process for determining capabilities of a wireless device can be implemented, in accordance with some aspects of the present disclosure.

In particular, FIG. 7 is a diagram illustrating an example environment 700 in which a process for determining capabilities of a wireless device can be implemented, in accordance with some aspects of the present disclosure. In the example of FIG. 7, multiple vehicles (704, 706, and 708), are shown navigating a roadway 702. In practice, a host vehicle 704 can be configured to classify remote vehicles 706, 708 based on communication capabilities supported by each vehicle.

A classification of remote vehicles 706, 708 can be made based on information received in one or more messages (e.g., one or more BSM) transmitted by the corresponding vehicle or device. Suppose that remote vehicle 706 supports one or more advanced V2X messaging capabilities, such as advanced safety and/or autonomous vehicle capabilities over NR V2X and/or 802.11bd. One or more messages (e.g., BSM) received by host vehicle 704, from remote vehicle 706, can include capability information indicating communication specifications and/or applications supported by remote vehicle 706. In such instances, the host vehicle 704 can classify the remote vehicle 706 based on the supported capabilities of remote vehicle 706. Additionally, subsequent messages transmitted by host vehicle 704 may be based on the determined classification of remote vehicle 706. For example, based on the capabilities of the surrounding V2X enabled vehicle (e.g., remote vehicle 706), host vehicle 704 can optimize a timing and/or frequency (or periodicity) with which advanced C-V2X messages are transmitted. It is understood that the optimization of message transmission can be based on the wireless capabilities of multiple other detected wireless entities in-range of host vehicle 704, such as one or more other vehicles, road side units (RSUs), and/or Vulnerable Road Users (VRUs), etc., without departing from the scope of the disclosed technology.

In other examples, host vehicle 704 may suppress or suspend transmissions of certain types of data and/or data for applications not supported by any in-range wireless devices, such as remote vehicle 706. That is, host vehicle 706 may modify one or more subsequent communications based on capabilities supported by remote vehicle 706. In some aspects, host vehicle 704 may transmit capability and/or classification information about remote vehicle 706 (e.g., via SDSM). As such, host vehicle 706 can notify other in-range wireless devices (e.g., other vehicles, RSUs, and/or VRUs, etc.), about the capabilities of remote vehicle 706, which can include one or more wireless communication specifications and/or applications supported by remote vehicle 706.

In some implementations, one or more remote vehicle (e.g., remote vehicle 708) may not support even basic messaging capabilities, such as BSM. In such instances, host vehicle 704 can be configured to classify remote vehicle 708 as a non-vehicle-to-everything (V2X) device, for example, based on the determination that the one or more messages have not been received from the second wireless device. In some examples, such classifications performed by host vehicle 704 may also be based on collected sensor data (e.g., LiDAR data, radar data, and/or sensor data) indicating the presence of a remote entity (e.g., remote vehicle 708). In the example of FIG. 7, remote vehicle 708 is located in a field-of-view of one or more sensors associated with host vehicle 704. As such, a classification of remote vehicle 708 can be based on the determined presence of remote vehicle 708 (using sensor data), and an absence of messaging received by host vehicle 704, from remote vehicle 708.

Similar to the examples discussed above, the classification of remote vehicle 708 can be used to trigger changes in communications transmitted by host vehicle 704. By way of example, if it is determined that there are no similarly capable (in-range) wireless devices, e.g., no SDSM and/or BSM capable device/s, then transmission of SDSM and/or BSM by host vehicle 704 may be suppressed or altogether halted. In some implementations, the classification of one or more in-range wireless devices can improve the situational awareness of host vehicle 704.

Figure 8:
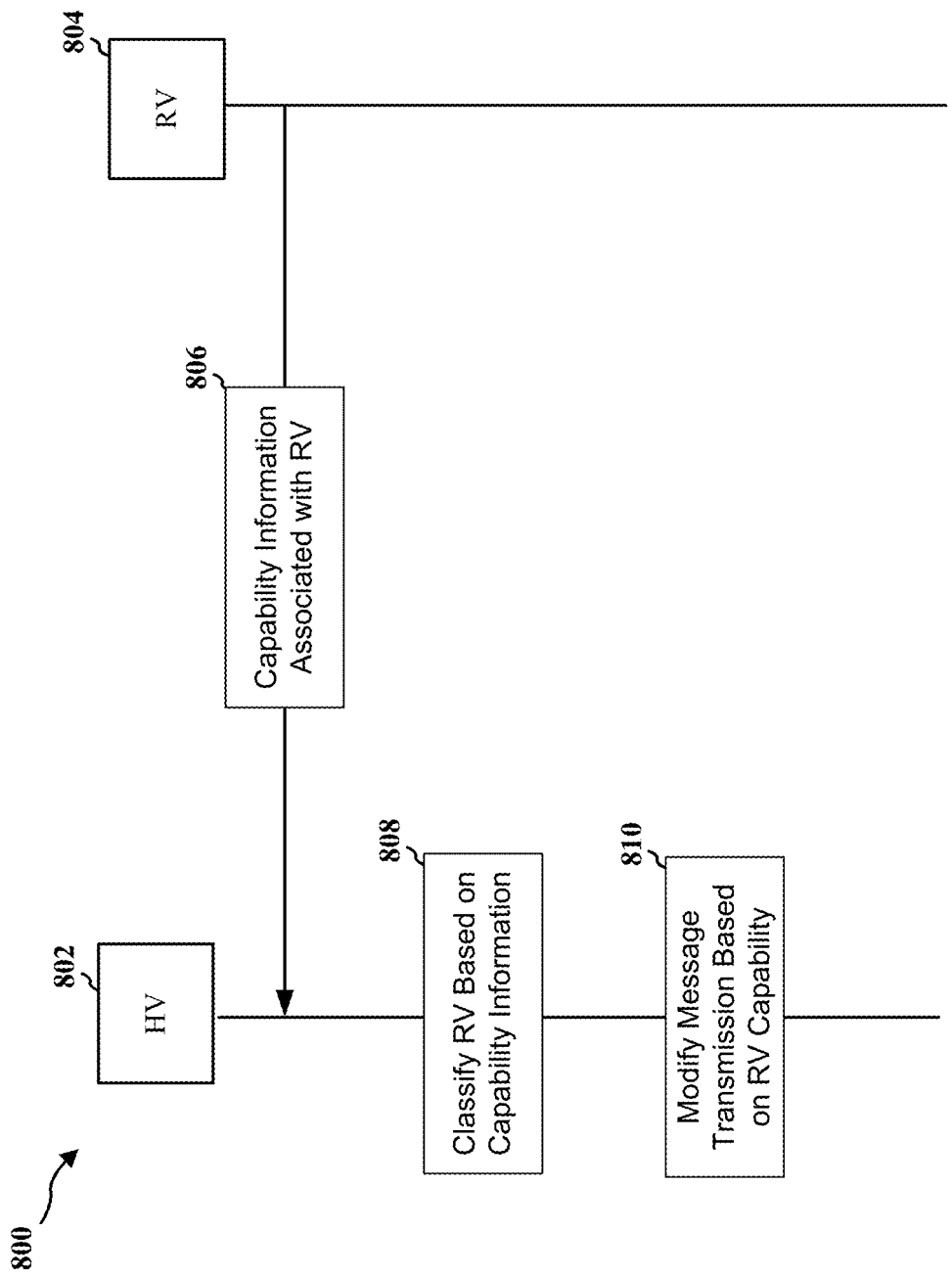
FIG. 8 is a call flow diagram illustrating an example process for determining capabilities of a wireless device, in accordance with some aspects of the present disclosure.

FIG. 8 is a call flow diagram 800 illustrating a process by which a host vehicle (HV) 802 can classify a remote vehicle (RV) 804, in accordance with some aspects of the present disclosure. In the example of FIG. 8, RV 804 transmits capability information 806 to HV 802. The capability information can be transmitted via one or more BSMs transmitted by RV 804. As discussed above, the capability information can convey capabilities of the transmitting device (e.g., RV 804). For example, the capability information can indicate enhanced safety capabilities, autonomous driving capabilities, and/or other advanced non-safety use cases. In some approaches, the capability information can be used to specify supported wireless standards, including but not limited to one or more of a Sensor Sharing Standard specification (e.g., SAE J3224), an On-Board System Requirements for V2V Safety Standard specification (e.g., J2945/1), a Maneuver Sharing and Coordinating Standard specification (e.g., SAE J3186), a Reference System Architecture standard (SAE J3161), and/or Cooperative Adaptive Cruise Control and Platooning Standard specification (e.g., SAE J2945/6), etc. In other approaches, capability information can indicate supported applications, for example, by indicating one or more Public Safety Identifications (PSIDs), for the application/s supported by RV 804.

Based on the received capability information, HV 802 can classify RV 804 at block 808. By way of example, suppose that RV 804 supports one or more advanced messaging capabilities, such as an advanced safety and/or autonomous vehicle capability. In such instances, the received capability information 806 can indicate communication specifications and/or applications supported by RV 804. In such instances, HV 802 can classify the RV 804 based on the supported capabilities.

In some aspects, subsequent messages transmitted by HV 802 can be based on the determined classification of RV 804. For instance, at block 810, the HV 802 can modify message transmission based on the capability (e.g., the classification) of the RV. In one example, based on the capabilities or classification of RV 804, HV 802 can optimize a timing and/or frequency (periodicity) of transmitted messages. In other aspects, HV 802 may suppress or suspend transmissions of certain types of data and/or data for applications not supported by any in-range wireless devices, such as RV 804. Additionally, in some aspects, HV 802 may transmit capability and/or classification information about RV 804 (e.g., via SDSM). That is, HV 802 can notify other in-range wireless devices, such as, other vehicles, RSUs, and/or VRUs, etc. (not illustrated), about the capabilities of RV 804, which can include one or more wireless communication standards and/or supported applications, as discussed above.

Figure 9:
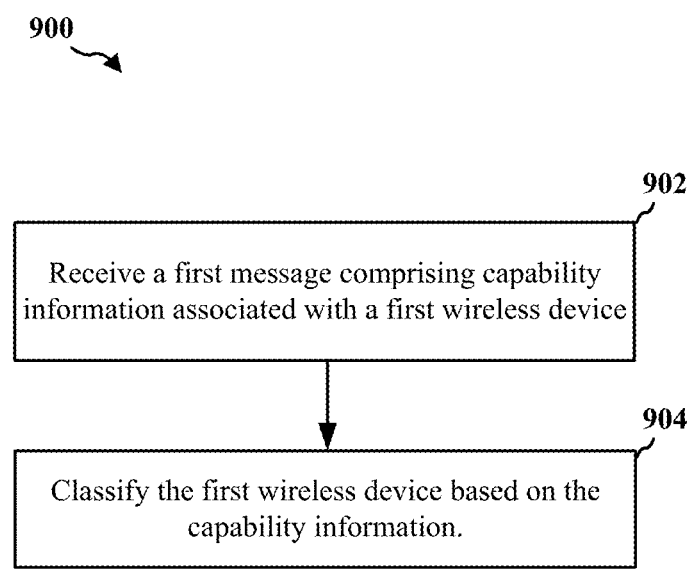
FIG. 9 is a flow diagram illustrating an example processes for classifying a wireless device based on capability information associated with the wireless device, in accordance with some aspects of the present disclosure.

FIG. 9 is a flow diagram illustrating an example processes 900 for classifying a wireless device based on capability information associated with the wireless device. At step 902, the process 900 includes receiving a first message comprising capability information associated with a first wireless device. As discussed above, the first message may be, or may include, a Basic Safety Message (BSM). Depending on the implementation, the first wireless device may be (or may include) a vehicle (e.g., a remote vehicle), a road side unit (RSU), or a Vulnerable Road User (VRU). In some aspects, the capability information associated with the first wireless device identifies one or more communication capabilities of the first wireless device. By way of example, the one or more communication capabilities of the first wireless device can include one or more safety application capabilities supported by the first wireless device. In some approaches, the capability information associated with the first wireless device can include an indication of at least one communication specification supported by the wireless device, and/or an indication of at least one application supported by the wireless device.

At step 904, the process 900 includes classifying the first wireless device based on the capability information. As discussed above, the classification of the first wireless device can affect subsequent transmissions, such as adjustments to a frequency of message transmission based on the capability information associated with the first wireless device.

In some examples, the process 900 and further include steps for identifying an existence of a second wireless device using one or more sensors, determining that one or more messages have not been received from the second wireless device, and classifying the second wireless device as a non-vehicle-to-everything (V2X) device based on the determination that the one or more messages have not been received from the second wireless device. In some aspects, the process 900 can further include steps for determining information for a second message based on classifying the first wireless device, and transmitting the second message including the determined information. Depending on the desired implementation, the second message can be (or may include) a Sensor Data Sharing Message (SDSM).

In some examples, the process 900 can further include steps for determining an existence of one or more wireless devices configured to process advanced safety messages in a communication range of the apparatus, and transmitting a second message based on determining the existence of the one or more wireless devices configured to process the advanced safety messages in the communication range of the apparatus.

Figure 10:
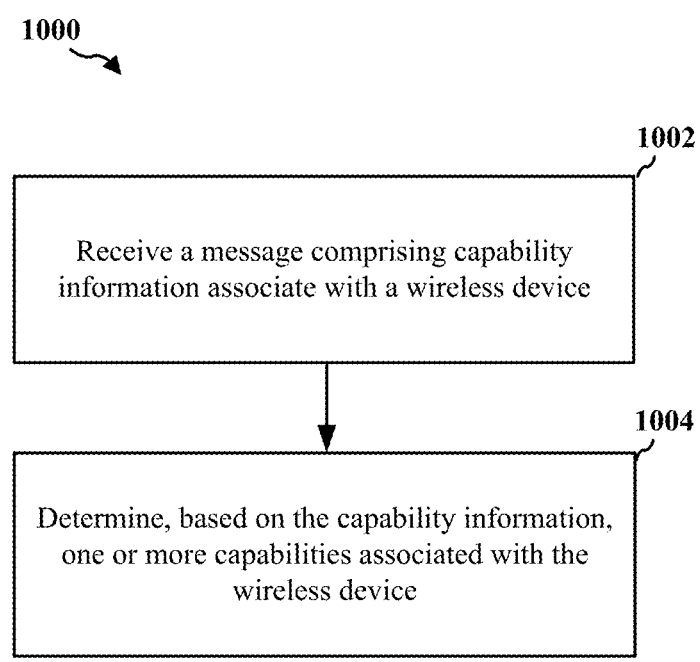
FIG. 10 is a flow diagram illustrating an example processes for determining capability information of a wireless device, in accordance with some aspects of the present disclosure.

FIG. 10 is a flow diagram illustrating an example processes 1000 for determining capability information of a wireless device, in accordance with some aspects of the present disclosure. At step 1002, the process 1000 includes receiving, a message comprising capability information associated with the wireless device. In some examples, the message comprising the capability information is a Basic Safety Message (BSM). For example, the capability information can be included in one or more extension fields of the BSM. As discussed above, the capability information can include an indication of at least one communication specification supported by the wireless device. By way of example, the at least one communication specification can include one or more of: a Cooperative Adaptive Cruise Control and Platooning specification, a Sensor Sharing specification, a Maneuver Sharing and Coordinating Service specification, a Reference System Architecture specification, or a combination thereof. In other examples, the capability information can include an indication of at least one application supported by the wireless device. For example, the capability information can include at least one Provider Service Identifier (PSID) indicating at least one application supported by the wireless device.

At step 1004, the process 1000 includes determining, based on the capability information, one or more capabilities associated with the wireless device.

Figure 11:
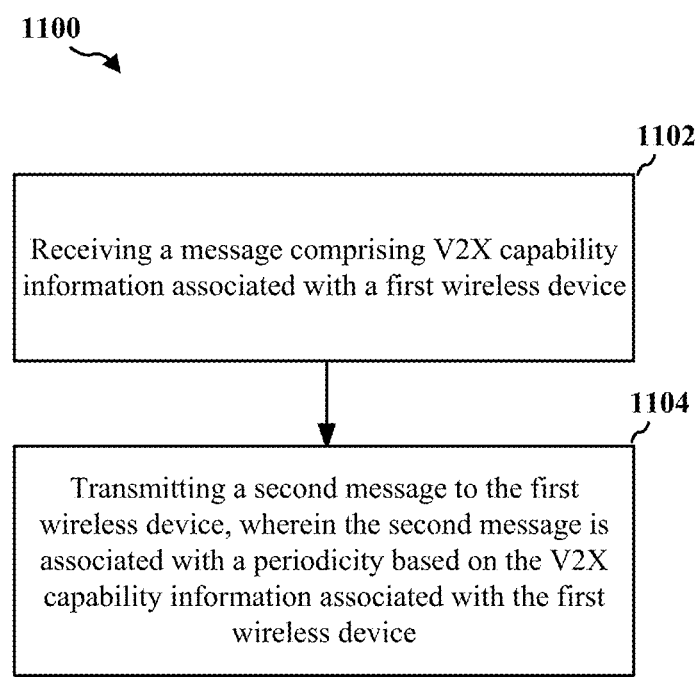
FIG. 11 is a flow diagram illustrating an example process for communicating with a wireless device based on capability information associated with the wireless device, in accordance with some aspects of the present disclosure.

FIG. 11 is a flow diagram illustrating an example process for communicating with a wireless device based on capability information associated with the wireless device, in accordance with some aspects of the present disclosure. At step 1104, the process 1100 includes receiving, a message comprising V2X capability information associated with the wireless device. In some examples, the message comprising the V2X capability information is a Basic Safety Message (BSM). For example, the V2X capability information can be included in one or more extension fields of the BSM. As discussed above, the V2X capability information can include an indication of at least one communication specification and/or application that is supported by the wireless device. By way of example, the at least one communication specification can include one or more of: a Cooperative Adaptive Cruise Control and Platooning specification, a Sensor Sharing specification, a Maneuver Sharing and Coordinating Service specification, a Reference System Architecture specification, or a combination thereof. In other examples, the capability information can include an indication of at least one application supported by the wireless device. For example, the capability information can include at least one Provider Service Identifier (PSID) indicating at least one application supported by the wireless device. In some aspects, the message may include a bit sequence or bitmask that indicates support for pre-define specifications and/or applications by the first wireless device. By way of example, the message may specify a vehicle type, make and/or model that corresponds with a known set of supported communication standards and/or applications.

At step 1104, the process 1100 includes transmitting a second message to the first wireless device. In some aspects transmission of the second message can be performed in a matter that is based on the capability information, e.g., that is based on the application and/or specification capabilities of the first wireless device. By way of example, the second message may be transmitted using a periodicity and/or frequency that is based on the V2X capability information associated with the first wireless device.

In some aspects, the V2X capability information can include information specifying one or more safety application capabilities supported by the first wireless device. Additionally, in some aspects, the process 1100 may further perform operations for identifying an existence of a second wireless device using one or more sensors of the apparatus, determining that one or more messages have not been received from the second wireless device, and/or classifying that the second wireless device as a non-vehicle-to-everything (V2X) device based on the determination that the one or more messages have not been received from the second wireless device.

Figure 12:
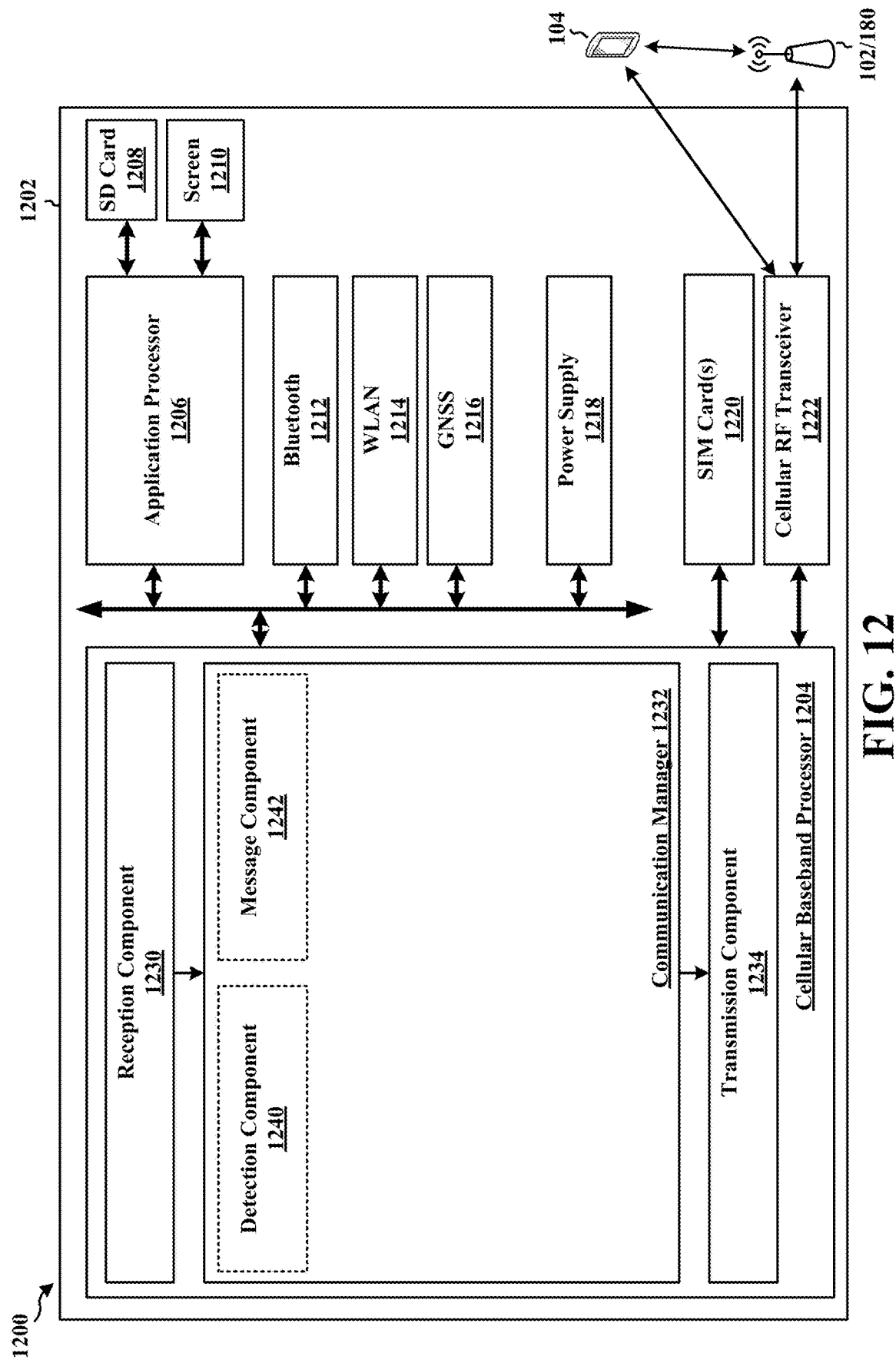
FIG. 12 is a diagram illustrating an example of a hardware implementation for an example apparatus, in accordance with some aspects of the present disclosure.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a GNSS module 1216, and a power supply 1218. The GNSS module 1216 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components, including a detection component 1240 configured to detect one or more objects and a message component 1242 configured to generate one or more messages (e.g., SDSMs, CPMs, BSMs, etc.). The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The apparatus may include additional components that perform each of the blocks of the algorithm in the aforementioned flowcharts of FIGS. 9, 10 and/or 11. As such, each block in the aforementioned flowcharts of FIGS. 9, 10, and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a first wireless device, a message indicating a threat entity within a threat zone. The threat entity transmits data that interferes with transmission of BSMs. The apparatus includes means for determining a candidate resource of a set of candidate resources on which to transmit a BSM based at least in part on the message indicating information related to the threat entity from the first wireless device. The apparatus includes means for transmitting, to at least a third wireless device, the BSM on a determined candidate resource. The apparatus further includes means for excluding one or more candidate resources in the set of candidate resources based on a projected RSRP for each candidate resource in the set of candidate resources exceeding an RSRP threshold to determine a first subset of candidate resources. The apparatus further includes means for ranking the first subset of candidate resources based on a weighted RSSI ranking to obtain a second subset of candidate resources with a lowest weighted RSSI. The second subset of candidate resources is a portion of the first subset of candidate resources. The apparatus further includes means for selecting a candidate resource from the second subset of candidate resources. The apparatus further includes means for excluding one or more virtually sensed candidate resources in the set of candidate resources having an RSSI that exceeds a pre-filter threshold to obtain a filtered subset of candidate resources that do not exceed the pre-filter threshold. The apparatus further includes means for excluding candidate resources within the filtered subset of candidate resources that do not exceed the pre-filter threshold that exceed an RSRP threshold to obtain a second subset of candidate resources that do not exceed the RSRP threshold. The apparatus further includes means for selecting the candidate resource from the second subset of candidate resources. The aforementioned means may be one or more of the aforementioned components of the apparatus 1202 configured to perform the functions recited by the aforementioned means.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. In some examples, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. An apparatus for determining capabilities of a wireless device, the apparatus comprising: at least one transceiver; at least one memory; and at least one processor communicatively coupled to the at least one transceiver and the at least one memory, the at least one processor configured to: receive, via the at least one transceiver, a first message comprising V2X capability information associated with a first wireless device; and transmit, via the at least one transceiver, a second message to the first wireless device, wherein the second message is associated with a periodicity based on the V2X capability information associated with the first wireless device.

Aspect 2. The apparatus of aspect 1, wherein the V2X capability information indicates support for one or more V2X applications of the first wireless device.

Aspect 3. The apparatus of any one of aspects 1 to 2, wherein the V2X capability information comprises information specifying one or more safety application capabilities supported by the first wireless device.

Aspect 4. The apparatus of any one of aspects 1 to 3, wherein the V2X capability information associated with the first wireless device comprises an indication of at least one communication specification supported by the first wireless device.

Aspect 5. The apparatus of any one of aspects 1 to 4, wherein the V2X capability information associated with the first wireless device comprises an indication of at least one application supported by the wireless device.

Aspect 6. The apparatus of any one of aspects 1 to 5, wherein the at least one processor is configured to: adjust a frequency of message transmission by the apparatus based on the V2X capability information associated with the first wireless device.

Aspect 7. The apparatus of any one of aspects 1 to 6, wherein the at least one processor is configured to: identify an existence of a second wireless device using one or more sensors of the apparatus; determine that one or more messages have not been received from the second wireless device; and classify the second wireless device as a non-vehicle-to-everything (V2X) device based on the determination that the one or more messages have not been received from the second wireless device.

Aspect 8. The apparatus of any one of aspects 1 to 7, wherein the first message includes a Basic Safety Message (BSM).

Aspect 9. The apparatus of any one of aspects 1 to 8, wherein the at least one processor is configured to: classify the first wireless device based on the V2X capability information; and determine information for the second message based on classifying the first wireless device.

Aspect 10. The apparatus of any one of aspects 1 to 9, wherein the first message includes a Basic Safety Message (BSM) and the second message includes a Sensor Data Sharing Message (SDSM).

Aspect 11. The apparatus of any one of aspects 1 to 10, wherein the at least one processor is configured to: determine an existence of one or more wireless devices configured to process advanced safety messages in a communication range of the apparatus; and transmit, via the at least one transceiver to the one or more wireless devices, the second message based on determining the existence of the one or more wireless devices configured to process the advanced safety messages in the communication range of the apparatus.

Aspect 12. The apparatus of any one of aspects 1 to 11, wherein the first message includes a Basic Safety Message (BSM) and the second message includes a Sensor Data Sharing Message (SDSM).

Aspect 13. The apparatus of any one of aspects 1 to 12, wherein the apparatus is a vehicle or a road side unit (RSU).

Aspect 14. The apparatus of any one of aspects 1 to 13, wherein the first wireless device is a vehicle, a road side unit (RSU), or a Vulnerable Road User (VRU).

Aspect 15. A method for determining capabilities of a wireless device, comprising: receiving, at an apparatus, a first message comprising V2X capability information associated with a first wireless device; and transmit, by the apparatus, a second message to the first wireless device, wherein the second message is associated with a periodicity based on the V2X capability information associated with the first wireless device.

Aspect 16. The method of aspect 15, wherein the V2X capability information indicates support for one or more V2X applications of the first wireless device.

Aspect 17. The method of any one of aspects 15 to 16, wherein the V2X capability information comprises information specifying one or more safety application capabilities supported by the first wireless device.

Aspect 18. The method of any one of aspects 15 to 17, wherein the V2X capability information associated with the first wireless device comprises an indication of at least one communication specification supported by the first wireless device.

Aspect 19. The method of any one of aspects 15 to 18, wherein the V2X capability information associated with the first wireless device comprises an indication of at least one application supported by the wireless device.

Aspect 20. The method of any one of aspects 15 to 19, further comprising: adjusting a frequency of message transmission by the apparatus based on the V2X capability information associated with the first wireless device.

Aspect 21. The method of any one of aspects 15 to 20, further comprising: identifying an existence of a second wireless device using one or more sensors of the apparatus; determining that one or more messages have not been received from the second wireless device; and classifying the second wireless device as a non-vehicle-to-everything (V2X) device based on the determination that the one or more messages have not been received from the second wireless device.

Aspect 22. The method of any one of aspects 15 to 21, wherein the first message includes a Basic Safety Message (BSM).

Aspect 23. The method of any one of aspects 15 to 22, further comprising: determining information for a second message based on classifying the first wireless device; and transmitting the second message including the determined information.

Aspect 24. The method of any one of aspects 15 to 23, wherein the first message includes a Basic Safety Message (BSM) and the second message includes a Sensor Data Sharing Message (SDSM).

Aspect 25. The method of any one of aspects 15 to 24, further comprising: determining an existence of one or more wireless devices configured to process advanced safety messages in a communication range of the apparatus; and transmitting a second message based on determining the existence of the one or more wireless devices configured to process the advanced safety messages in the communication range of the apparatus.

Aspect 26. The method of any one of aspects 15 to 25, wherein the first message includes a Basic Safety Message (BSM) and the second message includes a Sensor Data Sharing Message (SDSM).

Aspect 27. The method of any one of aspects 15 to 26, wherein the apparatus is a vehicle or a road side unit (RSU).

Aspect 28. The method of any one of aspects 15 to 27, wherein the first wireless device is a vehicle, a road side unit (RSU), or a Vulnerable Road User (VRU).

Aspect 29. A non-transitory computer-readable storage medium comprising at least one instruction for causing a computer or processor to: receive a first message comprising V2X capability information associated with a first wireless device; and transmit a second message to the first wireless device, wherein the second message is associated with a periodicity based on the V2X capability information associated with the first wireless device.

Aspect 30. An apparatus for determining capabilities of a wireless device, the apparatus comprising: means for receiving a first message comprising V2X capability information associated with a first wireless device; and means for transmitting a second message to the first wireless device, wherein the second message is associated with a periodicity based on the V2X capability information associated with the first wireless device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for determining capabilities of a wireless device, the apparatus comprising:
   at least one transceiver;
   at least one memory; and
   at least one processor communicatively coupled to the at least one transceiver and the at least one memory, the at least one processor configured to:
   receive, via the at least one transceiver, a first message comprising V2X capability information associated with a first wireless device;
   modify message transmission periodicity by the apparatus based on the V2X capability information associated with the first wireless device; and
   transmit, via the at least one transceiver, a second message to the first wireless device according to the modified message transmission periodicity.

2. The apparatus of claim 1, wherein the V2X capability information associated with the first wireless device indicates support for one or more V2X applications of the first wireless device.

3. The apparatus of claim 2, wherein the V2X capability information associated with the first wireless device comprises information specifying one or more safety application capabilities supported by the first wireless device.

4. The apparatus of claim 1, wherein the V2X capability information associated with the first wireless device comprises an indication of at least one communication specification supported by the first wireless device.

5. The apparatus of claim 1, wherein the V2X capability information associated with the first wireless device comprises an indication of at least one application supported by the first wireless device.

6. The apparatus of claim 1, wherein, to modify the message transmission periodicity by the apparatus, the at least one processor is configured to:
   adjust a frequency of message transmission by the apparatus based on the V2X capability information associated with the first wireless device.

7. The apparatus of claim 1, wherein the at least one processor is configured to:
   identify an existence of a second wireless device using one or more sensors of the apparatus;

determine that one or more messages have not been received from the second wireless device; and classify the second wireless device as a non-vehicle-to-everything (V2X) device based on the determination that the one or more messages have not been received from the second wireless device.

8. The apparatus of claim 1, wherein the first message includes a Basic Safety Message (BSM).

9. The apparatus of claim 1, wherein the at least one processor is configured to:

classify the first wireless device based on the V2X capability information; and determine information for the second message based on classifying the first wireless device.

10. The apparatus of claim 9, wherein the first message includes a Basic Safety Message (BSM) and the second message includes a Sensor Data Sharing Message (SDSM).

11. The apparatus of claim 1, wherein the at least one processor is configured to:

determine an existence of one or more wireless devices configured to process advanced safety messages in a communication range of the apparatus; and transmit, via the at least one transceiver to the one or more wireless devices, the second message based on determining the existence of the one or more wireless devices configured to process the advanced safety messages in the communication range of the apparatus.

12. The apparatus of claim 11, wherein the first message includes a Basic Safety Message (BSM) and the second message includes a Sensor Data Sharing Message (SDSM).

13. The apparatus of claim 1, wherein the apparatus is a vehicle or a road side unit (RSU).

14. The apparatus of claim 1, wherein the first wireless device is a vehicle, a road side unit (RSU), or a Vulnerable Road User (VRU).

15. A method for determining capabilities of a wireless device, comprising:

receiving, at an apparatus, a first message comprising V2X capability information associated with a first wireless device;

modify message transmission periodicity by the apparatus based on the V2X capability information associated with the first wireless device; and transmitting, by the apparatus, a second message to the first wireless device, wherein the second message is transmitted according to the modified message transmission periodicity.

16. The method of claim 15, wherein the V2X capability information associated with the first wireless device indicates support for one or more V2X applications of the first wireless device.

17. The method of claim 16, wherein the V2X capability information associated with the first wireless device comprises information specifying one or more safety application capabilities supported by the first wireless device.

18. The method of claim 15, wherein the V2X capability information associated with the first wireless device comprises an indication of at least one communication specification supported by the first wireless device.

19. The method of claim 15, wherein the V2X capability information associated with the first wireless device comprises an indication of at least one application supported by the wireless device.

20. The method of claim 15, further comprising wherein modifying the message transmission periodicity by the apparatus comprises:

adjusting a frequency of message transmission by the apparatus based on the V2X capability information associated with the first wireless device.

21. The method of claim 15, further comprising:

identifying an existence of a second wireless device using one or more sensors of the apparatus;

determining that one or more messages have not been received from the second wireless device; and classifying the second wireless device as a non-vehicle-to-everything (V2X) device based on the determination that the one or more messages have not been received from the second wireless device.

22. The method of claim 15, wherein the first message includes a Basic Safety Message (BSM).

23. The method of claim 15, further comprising:

determining information for a second message based on classifying the first wireless device; and transmitting the second message including the determined information.

24. The method of claim 23, wherein the first message includes a Basic Safety Message (BSM) and the second message includes a Sensor Data Sharing Message (SDSM).

25. The method of claim 15, further comprising:

determining an existence of one or more wireless devices configured to process advanced safety messages in a communication range of the apparatus; and transmitting a second message based on determining the existence of the one or more wireless devices configured to process the advanced safety messages in the communication range of the apparatus.

26. The method of claim 25, wherein the first message includes a Basic Safety Message (BSM) and the second message includes a Sensor Data Sharing Message (SDSM).

27. The method of claim 15, wherein the apparatus is a vehicle or a road side unit (RSU).

28. The method of claim 15, wherein the first wireless device is a vehicle, a road side unit (RSU), or a Vulnerable Road User (VRU).

29. A non-transitory computer-readable storage medium of an apparatus, the non-transitory computer-readable storage medium comprising at least one instruction for causing a computer or processor to:

receive a first message comprising V2X capability information associated with a first wireless device;

modify message transmission periodicity by the apparatus based on the V2X capability information associated with the first wireless device; and transmit a second message to the first wireless device according to the modified message transmission periodicity.

30. An apparatus for determining capabilities of a wireless device, the apparatus comprising:

means for receiving a first message comprising V2X capability information associated with a first wireless device;

means for modifying message transmission periodicity by the apparatus based on the V2X capability information associated with the first wireless device; and means for transmitting a second message to the first wireless device according to the modified message transmission periodicity.

* * * * *